United States Patent
Nam et al.

(10) Patent No.: US 7,593,084 B2
(45) Date of Patent: Sep. 22, 2009

(54) IPS LCD DEVICE COMPRISING AN EMPTY SPACE FILLED WITH AIR FORMED BETWEEN THE COMMON AND PIXEL ELECTRODES AND A METHOD OF FABRICATING THE SAME

(75) Inventors: Seung-Hee Nam, Gyeonggi-Do (KR); Soon-Sung Yoo, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 252 days.

(21) Appl. No.: 11/646,533

(22) Filed: Dec. 28, 2006

(65) Prior Publication Data
US 2008/0002127 A1   Jan. 3, 2008

(30) Foreign Application Priority Data
Jun. 29, 2006   (KR) .................... 10-2006-0059963

(51) Int. Cl.
    G02F 1/1343    (2006.01)
    G02F 1/13      (2006.01)
(52) U.S. Cl. .................. 349/141; 349/138; 349/187
(58) Field of Classification Search .................. 349/141
    See application file for complete search history.

(56) References Cited

U.S. PATENT DOCUMENTS

| 2002/0018166 A1* | 2/2002 | Matsumoto et al. ......... 349/141 |
| 2003/0085406 A1* | 5/2003 | Cheng ......................... 257/72 |
| 2005/0046771 A1* | 3/2005 | Lee et al. .................... 349/126 |

* cited by examiner

*Primary Examiner*—Andrew Schechter
*Assistant Examiner*—Charles Chang
(74) *Attorney, Agent, or Firm*—McKenna Long & Aldridge LLP

(57) ABSTRACT

An LCD device having an improved aperture ratio is disclosed. The LCD device includes first and second substrate facing each other; gate and data lines formed on the first substrate, wherein the gate and data lines are formed substantially perpendicularly with respect to each other to define a pixel region; common and pixel electrodes formed in the pixel region, wherein the common and pixel electrodes are arranged in an alternating pattern with an empty space therebetween, wherein a horizontal electric field is generated between the common and pixel electrodes; and a liquid crystal layer formed between the first and second substrates.

10 Claims, 8 Drawing Sheets

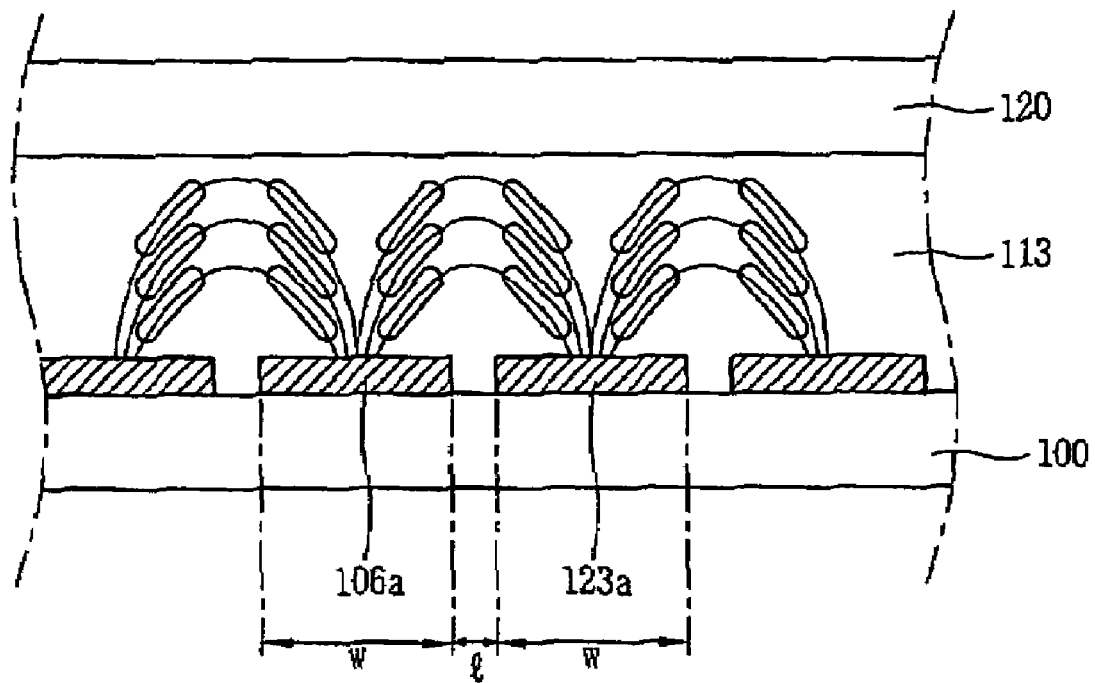

IPS LCD DEVICE COMPRISING AN EMPTY SPACE FILLED WITH AIR FORMED BETWEEN THE COMMON AND PIXEL ELECTRODES AND A METHOD OF FABRICATING THE SAME

This application claims the benefit of Korean Application No. 10-059963, filed on Jun. 29, 2006, which is hereby incorporated by reference for all purposes as if fully set forth herein.

BACKGROUND OF THE INVENTION

1. Field of the Invention

The present invention relates to a liquid crystal display (LCD) device, and more particularly, to an In-Plane Switching (IPS) mode LCD device to improve an aperture ratio.

2. Discussion of the Related Art

Among flat panel display devices, a Twisted Nematic (TN) mode LCD device is generally used because of its advantageous properties of high picture quality and low power consumption. However, the TN mode LCD device has the problem of a narrow viewing angle. This is because of the refractive anisotropy of a liquid crystal molecule. When a voltage is applied to an LCD panel including the liquid crystal molecule aligned in parallel to a substrate, the liquid crystal molecule is aligned in vertical to the substrate.

To overcome the problem of a narrow viewing angle, an In-Plane Switching (IPS) mode LCD device has been actively researched and studied, wherein the liquid crystal molecule is aligned in parallel to the substrate.

FIG. 1A is a plan view illustrating a unit pixel region of a related art IPS mode LCD device. FIG. 1B is a cross section view along I-I' of FIG. 1A.

As shown in FIGS. 1A and 1B, a gate line 1 and a data line 3 are perpendicularly formed on a first transparent substrate 10, wherein the gate and data lines 1 and 3 define a unit pixel region. Substantially, as providing 'n' gate lines and 'm' data lines, the LCD device is provided with 'n×m' pixel regions. In the drawings, only one pixel region is shown for convenience of explanation.

At a crossing portion of the gate and data lines 1 and 3, there is a thin film transistor (TFT) including a gate electrode 1a, an active layer 5 and source and drain electrodes 2a and 2b. The gate electrode 1a is connected with the gate line 1, and the source and drain electrodes 2a and 2b are connected with the data line 3. Also, a gate insulation layer 8 is interposed between the gate line 1 and the data line 3.

The pixel region is provided with a common line 4 which is parallel to the gate line 1. Also, at least one pair of electrodes, that is, a common electrode 6 and a pixel electrode 7 are formed in the pixel region to switch liquid crystal molecules, wherein the common and pixel electrodes 6 and 7 are formed in parallel to the data line 3. The common electrode 6 is formed at the same time as the gate line 1, and is connected to the common line 4. Also, the pixel electrode 7 is formed at the same time as the source and drain electrodes 2a and 2b, and is connected with the drain electrode 2b of the thin film transistor 9. Then, a passivation layer 11 is formed on an entire surface of the first substrate 10 including the source and drain electrodes 2a and 2b. Also, a pixel electrode line 14 is overlapped with the common line 4, wherein the pixel electrode line 14 is connected with the pixel electrodes 7, to thereby form a storage capacitor (Cst) with an insulation layer 8 therebetween.

Also, a second substrate 20 includes a black matrix 21 which prevents light from leaking on portions corresponding to the thin film transistor 9, the gate line 1 and the data line; and a color filter 23 which represents various colors. In addition, alignment layers 12a and 12b are formed on facing surfaces of the first and second substrates 10 and 20, thereby determining an initial alignment direction of the liquid crystal molecules.

A liquid crystal layer 13 is formed between the first and second substrates 10 and 20, wherein the liquid crystal layer 13 is driven by a voltage applied to the common and pixel electrodes 6 and 7. That is, the liquid crystal layer 13 controls the light transmittance based on the voltage applied.

If a voltage is not applied to the above-mentioned IPS mode LCD device, the liquid crystal molecules of the liquid crystal layer 13 are aligned along the direction of the alignment layer formed on the facing surfaces of the first and second substrates 10 and 20. However, a the voltage is applied between the common and pixel electrodes 6 and 7, the liquid crystal molecules are switched and aligned in parallel to the substrate, that is, in parallel to the gate line 1. That is, if the voltage is applied between the common and pixel electrodes 6 and 7, an electric field occurs therebetween, whereby the liquid crystal molecules transmit the light based on the electric field and the voltage.

FIG. 2 is a cross section view explaining a driving principle of a related art IPS mode LCD device. In the related art IPS mode LCD device, the common electrode 6 and the pixel electrode 7 are formed on the same substrate, whereby the electric field occurs in parallel to the substrate, that is, the horizontal electric field. Thus, because the liquid crystal molecules are aligned along the horizontal electric field, the alignment of liquid crystal molecule is changed based on the voltage applied, thereby realizing a wide viewing angle.

However, the common and pixel electrodes 6 and 7 are formed in the pixel region of displaying images, whereby a luminance deteriorates due to a low aperture ratio. That is, as an interval between the common and pixel electrodes 6 and 7 increases, the luminance improves because of the increase of aperture ratio. As the interval between the common and pixel electrodes 6 and 7 decreases, the luminance is lowered due to the decrease of aperture ratio. As increasing the interval between the common and pixel electrodes so as to improve the aperture ratio, the high voltage is applied to drive the common and pixel electrodes.

Just above the common and pixel electrodes, there is a vertical electric field instead of the horizontal electric field. Thus, the liquid crystal molecules positioned above the two electrodes are aligned differently from those of the other portions having the horizontal electric field. Accordingly, since the liquid crystal molecules positioned above the common and pixel electrodes are not aligned by the horizontal electric field, it can not be used as the driving area of displaying the images.

SUMMARY OF THE INVENTION

Accordingly, the present invention is directed to a liquid crystal display device and method of fabricating the same that substantially obviate one or more problems due to limitations and disadvantages of the related art.

An advantage of the present invention is to provide an IPS mode LCD device which has a decreased interval between common and pixel electrodes, to thereby drive the electrodes with a low driving voltage.

Another advantage of the present invention is to provide an IPS mode LCD device wherein an interval between common and pixel electrodes is decreased, and the common and pixel electrodes are formed of transparent electrodes, so that upper portions above the transparent electrodes are used as a driving area in the same manner as a Fringe Field Switching (FFS) mode LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an IPS mode LCD device comprising first and second substrate facing each other; gate and data lines formed on the first substrate, wherein the gate and data lines are formed substantially perpendicularly with respect to each other to define a pixel region; common and pixel electrodes formed in the pixel region, wherein the common and pixel electrodes are arranged in an alternating pattern with an empty space therebetween, wherein a horizontal electric field is generated between the common and pixel electrodes; and a liquid crystal layer formed between the first and second substrates.

In another aspect of the present invention, there is provided a method of fabricating an IPS mode LCD device comprising forming a gate line having a gate electrode and a common line on a substrate; forming a conductive layer pattern electrically connected with the common line on the substrate where the common line is formed; providing a gate insulation layer on the gate electrode where the conductive layer pattern is formed; sequentially forming an active layer and a data line having source and drain electrodes; forming a passivation layer and a photoresist pattern that covers a part of a passivation layer corresponding to the conductive layer pattern on an entire surface of the substrate where the data line is formed; etching the passivation layer using the photoresist pattern as a mask to form a passivation layer pattern; etching the conductive layer pattern using the photoresist pattern as a mask to form a common electrode having an under-cut side surface; forming a transparent conductive layer on the first substrate having the photoresist pattern and the common electrode, wherein an empty space is formed between the transparent conductive layer and the common electrode; and removing the transparent conductive layer on the photoresist pattern and the photoresist pattern using a lift-off method to form a pixel electrode spaced from the common electrode a width of the empty space.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a concept view illustrating the alignment of liquid crystal molecules in an IPS mode LCD device according to the present invention.

DETAILED DESCRIPTION OF THE ILLUSTRATED EMBODIMENTS

Reference will now be made in detail to embodiments of the present invention, examples of which are illustrated in the accompanying drawings.

Hereinafter, an IPS mode LCD device according to the present invention and a method of fabricating the same will be described with reference to the accompanying drawings.

Figure 1A:
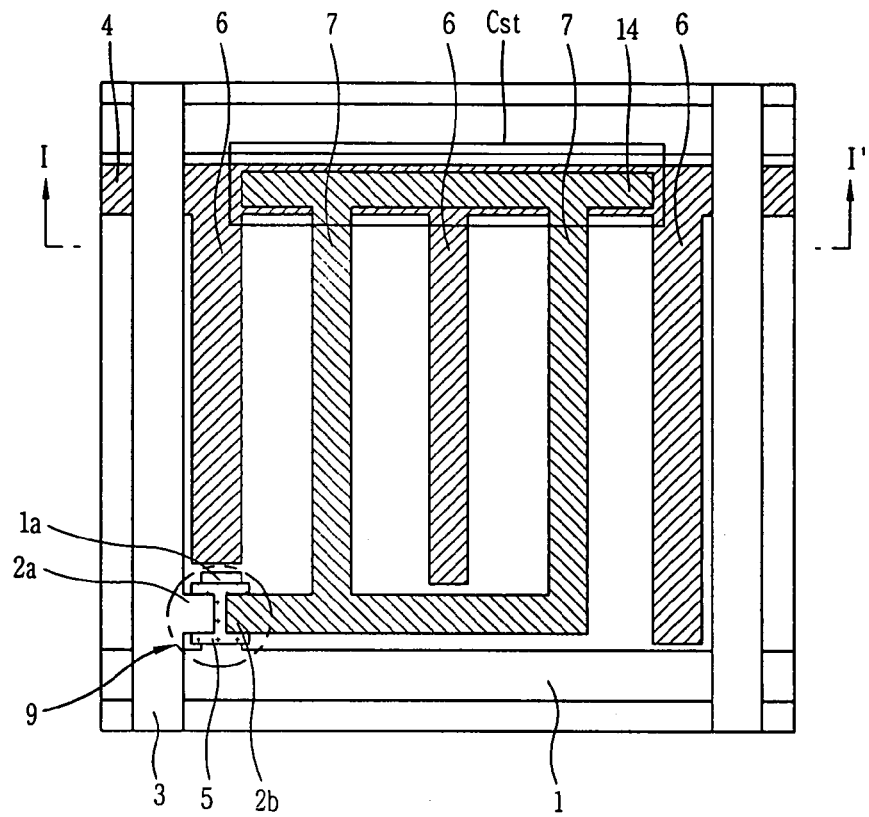
FIG. 1A is a plan view illustrating a unit pixel region of a related art IPS mode LCD device.
Figure 1B:
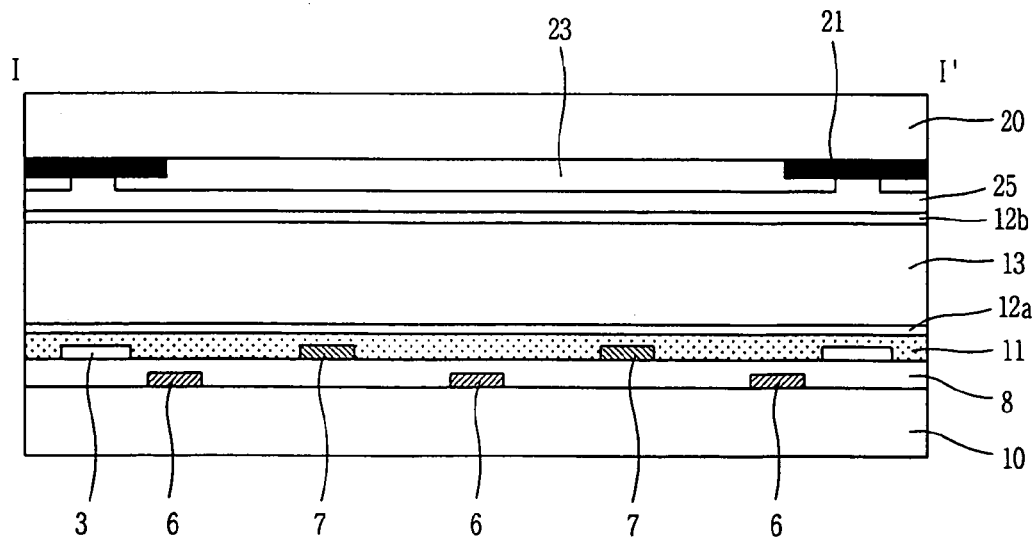
FIG. 1B is a cross section view along I-I' of FIG. 1A.
Figure 2:
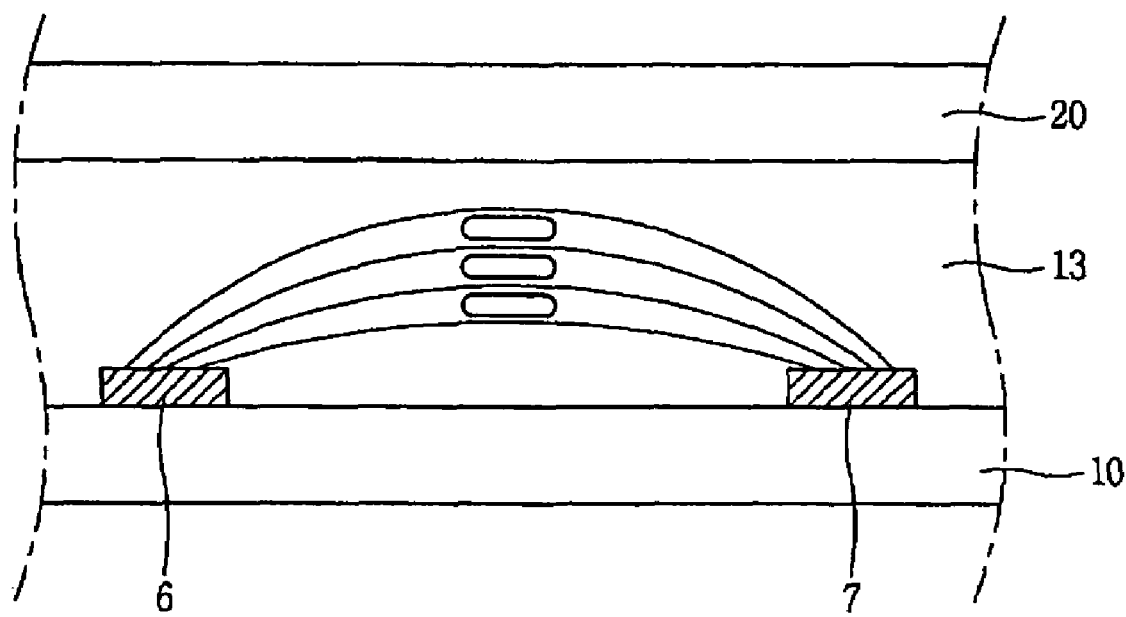
FIG. 2 is a cross section view explaining a driving principle of a related art IPS mode LCD device.
Figure 3A:
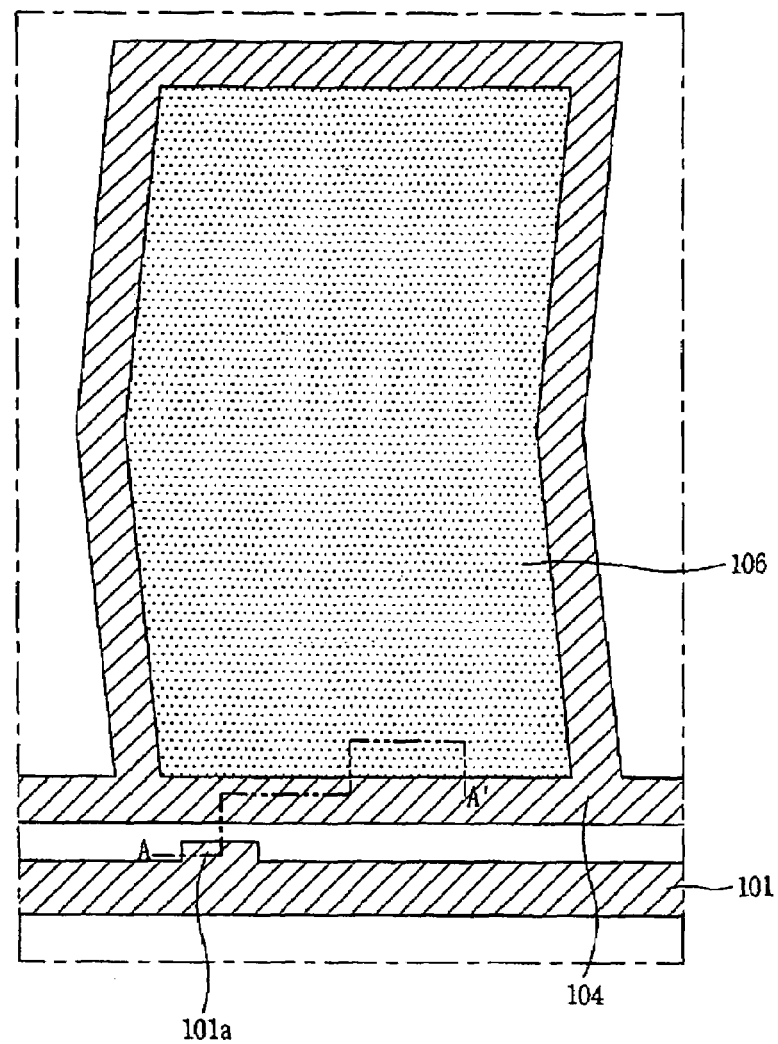
FIGS. 3A, 4A and 5A are plan views illustrating a method of fabricating an IPS mode LCD device according to the present invention.
Figure 3B:
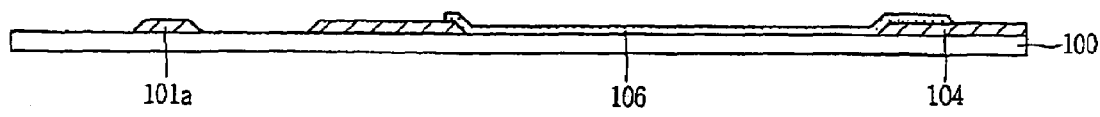
FIG. 3B is a cross section view along A-A' of FIG. 3A.
Figure 4A:
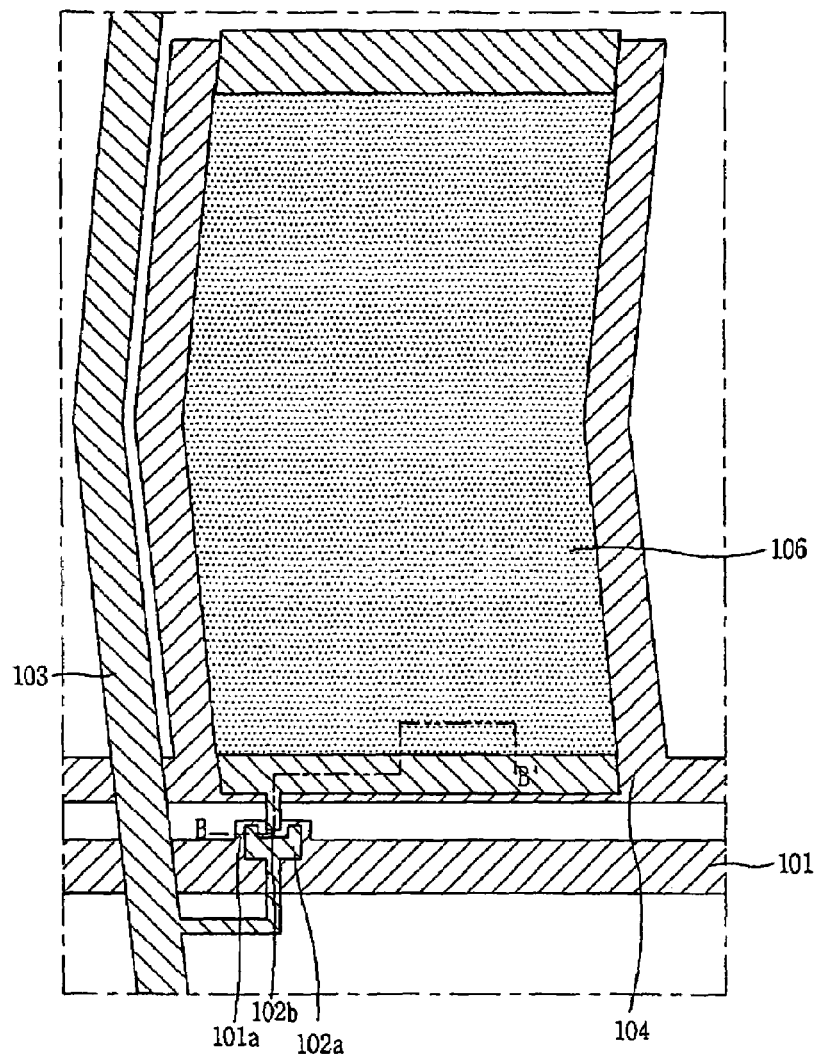
Figure 4B:
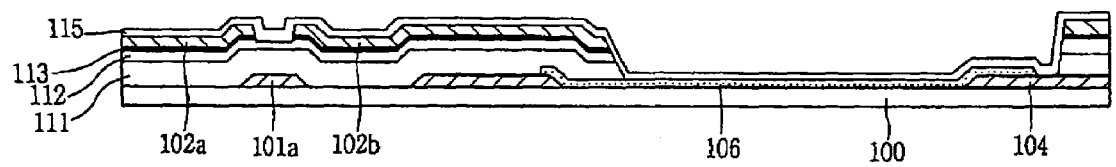
FIGS. 4B and 4C are cross section views along B-B' of FIG. 4A.
Figure 4C:
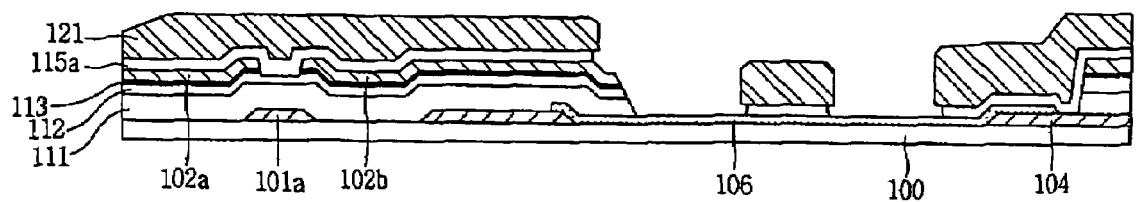
Figure 5A:
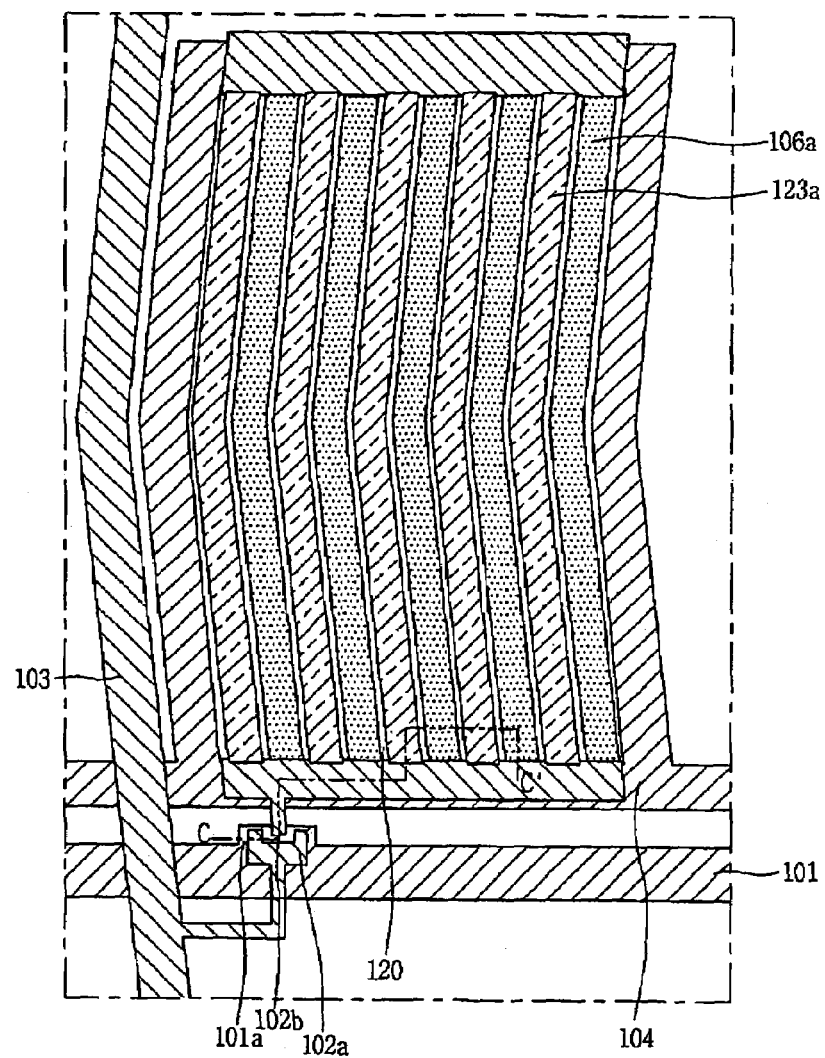
Figure 5B:
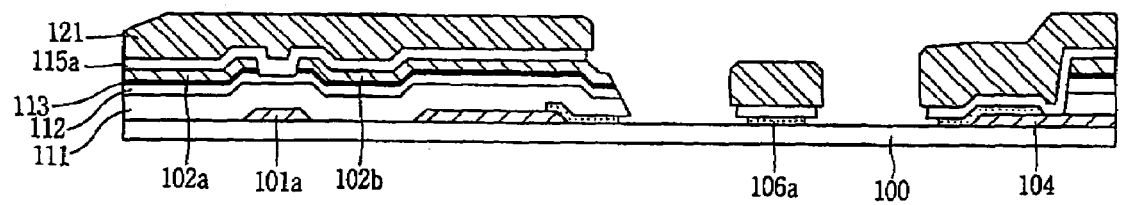
FIGS. 5B to 5D are cross section views along C-C' of FIG. 5A.
Figure 5C:
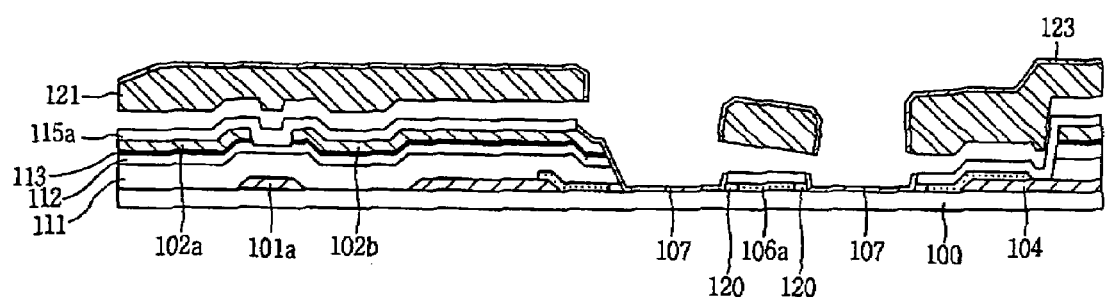
Figure 5D:
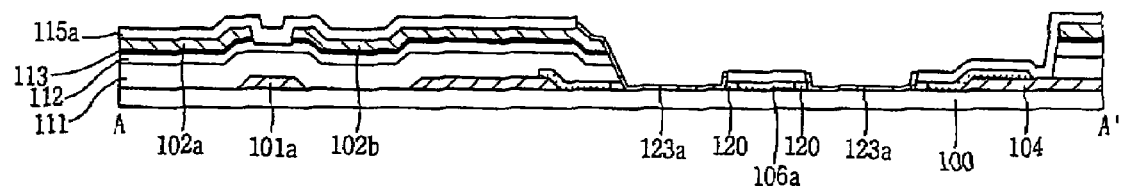

FIGS. 3A, 4A and 5A are plan views of a method of fabricating an IPS mode LCD device according to the present invention. FIG. 3B is a cross section view along A-A' of FIG. 3A. FIGS. 4B and 4C are cross section views along B-B' of FIG. 4A. FIGS. 5B to 5D are cross section views along C-C' of FIG. 5A.

As shown in FIGS. 3A and 3B, a first metal layer is formed on a first substrate, and is etched using a first mask, thereby forming a gate line 101, a gate electrode 101a, and a common line 104. The first metal layer may be formed by deposition or sputtering, and may be patterned by photolithography. The first metal layer may be formed of any one of conductive metal materials, for example, aluminum, copper, chrome, and argentums.

Then, a transparent conductive material layer is formed on an entire surface of the first substrate including the common line 104, and is etched using a second mask, thereby forming a preliminary common electrode 106 which is electrically connected with the common line 104. The transparent conductive material layer may be a metal oxide such as Indium Tin Oxide (ITO) or Indium Zinc Oxide (IZO).

As shown in FIGS. 4A and 4B, a gate insulation layer 111 is formed on the first substrate including the preliminary common electrode 106, whereby an active layer 112 of silicon and an ohmic contact layer 113 and a source electrode 102a and drain electrode 102b doped with impurity ions are formed in sequence. The gate insulation layer 111 may be formed of silicon nitride SiNx or silicon oxide SiOx. An amorphous silicon layer, an impurity-doped silicon layer and a second metal layer are sequentially deposited on the substrate including the gate insulation layer 111. the second metal layer is formed by deposition or sputtering. Then, the second metal layer, the impurity-doped silicon layer and the amorphous silicon layer are sequentially patterned, thereby sequentially forming a source electrode 102a and drain electrode 102b, an ohmic contact layer 113 and an active layer 112.

At this time, the third mask may be formed of a half-tone mask or a gray-tone mask.

After that, a passivation layer 115 is formed on the first substrate including the source and drain electrodes 102a and 102b. The passivation layer 115 may be formed of an inorganic material such as silicon nitride or silicon oxide, or an organic material such as BenzoCycloButene (BCB).

As shown in FIG. 4C, a photoresist layer (not shown) is formed on the passivation layer 115, and is patterned using a fourth mask, thereby forming a photoresist pattern 121. The passivation layer is dry-etched using the photoresist pattern 121. The passivation layer is undercut to apply a lift-off method with easiness. At this time, the reference number 115a of FIG. 4C is the undercut passivation layer.

As shown in FIGS. 5A and 5B, a next step is to etch the preliminary common electrode positioned below the undercut passivation layer 115a. The common electrode 106 positioned below the undercut passivation layer 115a is etched by the wet-etching method. As the lower side portion of the undercut passivation layer 115a is over-etched by the wet-etching method, the common electrode pattern is undercut. As a result, the remaining common electrode pattern corresponds to the common electrode 106a. The space 120 formed by the undercut corresponds to an interval between the common electrode and the pixel electrode, which can be controlled within the range of about 0.1 µm to about 3 µm based on the process margin.

As shown in FIGS. 5A and 5B, a next step is to etch the preliminary common electrode positioned below the undercut passivation layer 115a. The common electrode positioned below the undercut passivation layer 115a is etched by the wet-etching method. As the side portion of the undercut passivation layer 115a is over-etched by the wet-etching method, the preliminary common electrode exposed by the undercut passivation layer 115a is undercut.

As a result, the remaining preliminary common electrode corresponds to the common electrode 106a. The space 120 formed by the undercut corresponds to an interval between the common electrode 106a and the pixel electrode formed in the following process, which can be controlled within the range of about 0.1 µm to about 3 µm based on the process margin.

If the preliminary common electrode is wet-etched so that an undercut level of the common electrode 106a may be 3 µm, the common electrode 106a has an excellent lateral profile. However, if the undercut level is more than the 3 µm, the lateral profile of the common electrode 106a becomes non-uniformity. As the result, a distance between the common electrode 106a and the pixel electrode to be formed thereafter is not uniform thus to generate stain. Accordingly, the most preferably, the undercut level of the common electrode 106a is within the range of about 0.1 to about 3 µm.

As shown in FIG. 5C, after forming the common electrode 106a, a transparent conductive layer 123 for the pixel electrode is deposited on the entire surface of the substrate including the photoresist pattern 121, and is lifted-off. At this time, since the passivation layer is undercut, the transparent conductive layer is deposited on the photoresist pattern 121 except the undercut portion, and the exposed substrate. The transparent conductive layer may be formed of a metal oxide, for example, Indium Tin Oxide (ITO) or Indium Zinc Oxide (IZO).

As shown in FIG. 5D, as the photoresist pattern is lifted-off, the photoresist and the transparent conductive layer deposited thereon are removed together. The remaining transparent conductive layer corresponds to the pixel electrode 123a. The pixel electrode 123a is electrically connected with a side of the drain electrode 102b.

If the common electrode is undercut by the wet-etching method before depositing the transparent conductive layer, the pixel electrode is deposited when the common electrode 106 is not formed below the edge of the photoresist pattern 121. Accordingly, the pixel electrode 123a and the common electrode 106a are formed on the same plane, and the empty space 120 is formed between the two electrodes, whereby the passivation layer remains on the common electrode. Thus, the empty space 120 formed between the two electrodes is filled with air. In this case, the air has a low conductivity, whereby it functions as an insulation layer.

As mentioned above, after completing the first substrate including the thin film transistor, the common electrode 106a and the pixel electrode 123a, the second substrate is prepared, wherein the second substrate is positioned opposite the first substrate. Then, the liquid crystal layer is formed between the first and second substrates, thereby completing the LCD device.

The IPS mode LCD device is fabricated according to the above-mentioned process.

As shown in FIGS. 5A to 5D, the IPS mode LCD device according to the present invention includes a plurality of gate lines 101 formed in a first direction on a first transparent substrate 100; and a plurality of data lines 103 formed in a second direction which is substantially perpendicular to the first direction, whereby a plurality of pixel regions are defined by crossing of the plurality of gate and data lines formed substantially perpendicularly.

Then, a thin film transistor is formed at each crossing portion of the gate and data lines 101 and 103, wherein the thin film transistor functions as a switching device. The thin film transistor includes a gate electrode 101a; an active layer 112 formed on the gate electrode 101a; and source and drain electrodes 102a and 102b formed on an ohmic contact layer 113 at a fixed interval from each other. The pixel region is provided with a plurality of common electrodes 106a and pixel electrodes 123a. The common and pixel electrodes 106a and 123a are formed of a transparent conductive material. Also, the common and pixel electrodes 106a and 123a are formed on the same plane, and are alternately arranged with an empty space 120 therebetween.

The second substrate includes a black matrix which prevents the light leakage; and a color filter which represent various colors. Thereafter, alignment layers are formed on facing surfaces of the first and second substrates, and the liquid crystal layer is formed between the first and second substrates.

The above-mentioned IPS mode LCD device according to the present invention is characterized in that the common and pixel electrodes 106a and 123a are formed of the transparent electrodes, and the two electrodes 106a and 123a are formed on the same plane and which are alternately arranged with the air layer (empty space) 123 therebetween. As explained above, after etching the common electrode by the lift-off process, the pixel electrode is deposited thereon. Thus, the two electrodes are separated from each other by the empty space 120 due to the undercut. The empty space 120 is filled with the air, which functions as the insulation layer since the air has the low conductivity.

At this time, the interval between the common and pixel electrodes 106a and 123a is proportional to the driving voltage. For example, if the interval between the common and pixel electrodes 106a and 123a increases, the driving voltage for forming the horizontal electric field, that is, the application voltage is also increased. If the interval between the common and pixel electrodes 106a and 123a decreases, the driving voltage for forming the horizontal electric field, that is, the application voltage is also decreased. Accordingly, when the interval between the common and pixel electrodes 106a and 123a is small, it is possible to drive the LCD device with a small voltage. For the LCD device according to the present invention, it is possible to perform a dry-etching method on the passivation layer using the photoresist pattern, and to control the undercut level by the deposition and wet-etching of the transparent conductive layer. The undercut level can be controllable within the range of about 0.1 µm to 3 μm. The undercut portion corresponds to the interval 120 between the common and pixel electrodes.

According to the above-mentioned method according to the present invention, the common and pixel electrodes are formed, and the interval between the two common electrodes is decreased, so that it is possible to decrease the driving voltage of the LCD device.

The IPS mode LCD device according to the present invention can improve the aperture ratio. In case of the IPS mode LCD device according to the present invention, the pixel and common electrodes are formed of the transparent electrodes, and the interval between the two electrodes is smaller than that of the related art. Thus, the liquid crystal molecules of the LCD device according to the present invention are aligned similar to those of the FFS (Fringe Field Switching) mode LCD device.

In the IPS mode LCD device, the common and pixel electrodes are formed in the driving area, and the horizontal electric field is not formed just above the common and pixel electrodes, which corresponds to the non-driving area, so that the aperture ratio is lowered. To overcome this problem of the IPS mode LCD device, there has been proposed the FFS mode LCD device, which improves the light transmittance by using the alignment properties of liquid crystal molecules and the lateral electric field of the IPS switching mode. For the FFS mode LCD device, a plurality of common electrodes having a flat shape and a plurality of pixel electrodes having a slit shape patterned in a long pole are formed in the pixel region, wherein the pixel and common electrodes alternates with each other in state of providing an insulator therebetween, and the pixel and common electrode are overlapped with each other. This FFS mode LCD device is different from the IPS mode LCD device in that the FFS mode LCD device forms the horizontal electric field in state of providing the small interval between the common and pixel electrodes. Also, the liquid crystal molecules positioned above the common and pixel electrodes are aligned by the electric field. Furthermore, it is possible to realize the high light-transmittance since the pixel and common electrode are formed of the transparent conductive layers, and to improve the aperture ratio, whereby the luminance of the LCD device improves.

The IPS mode LCD device of the present invention can provide the electric field which is similar to that of the FFS mode LCD device.

FIG. 6 is a concept view of illustrating alignment of liquid crystal molecules in an IPS mode LCD device according to the present invention.

As explained above, even if the LCD device of the present invention is applied to the IPS mode, the LCD device of the present invention can realize the small interval between the common and pixel electrodes, wherein the interval between the two electrodes is smaller than the width (w) of the electrode, similar to the FFS mode LCD device.

In the related art IPS mode LCD device, the interval between the two electrodes is larger than a width of the electrodes. Furthermore, the electric field formed just above the electrodes is not the horizontal type but the vertical type, whereby the liquid crystal molecules positioned just above the electrodes are not aligned, that is, they correspond to the non-driving area, whereby the aperture ratio is lowered.

However, the IPS mode LCD device of the present invention realizes the small interval between the common and pixel electrodes, wherein the interval between the common and pixel electrodes is smaller than the width (w) of the electrodes. Also, the common and pixel electrodes are formed of the transparent electrodes. As a result, the fringe field occurs above the pixel and common electrodes, whereby the liquid crystal molecules are aligned in the entire area, thereby improving the light transmittance.

Also, the common and pixel electrodes are formed of the transparent conductive materials, thereby improving the aperture ratio. If the common and pixel electrodes are formed of the opaque metal layers, the aperture ratio is lowered since it is impossible to transmit the light through the two electrodes. In a case of the related art IPS mode LCD device, the common electrode is formed of the metal layer because the vertical electric field is formed above the common electrode. That is, even though the common electrode is formed of the transparent material, it is not the driving area, whereby the aperture ratio is lowered. However, the IPS mode LCD device according to the present invention has the similar effect as that of the FFS mode LCD device, whereby the portions above the common and pixel electrodes correspond to the driving area. In this respect, it is necessary for the IPS mode LCD device of the present invention to provide the common and pixel electrodes formed of the transparent conductive material.

For example, the common and pixel electrodes may be formed of ITO or IZO, or other transparent conductive materials which can be deposited on the substrate.

Even though the LCD device according to the present invention is applied to the IPS mode, it is possible to drive the liquid crystal molecules positioned above the entire area including the pixel and common electrodes, thereby improving the light transmittance. Furthermore, the interval between the common and pixel electrodes is small, whereby the driving voltage for driving the common and pixel electrodes is also decreased, whereby the LCD device can be driven with the small driving voltage.

At this time, the interval between the common and pixel electrodes is about 0.1 μm to 3 μm. As forming the undercut in the steps of patterning the photoresist and patterning the transparent conductive layer (corresponding to the common electrode), it is possible to control the interval between the common and pixel electrodes. The transparent conductive layer may be etched for example, by the wet-etching method. In this case, the interval between the common and pixel electrodes can be controlled based on the etching level.

The present invention may also be applied to a multi-domain LCD device which has common and pixel electrodes formed in a bent structure. In a case of a related art IPS mode LCD device, liquid crystal molecules of the liquid crystal layer are aligned at a predetermined angle in a length direction of a gate line formed on a substrate, whereby a color shift occurs based on a viewing-angle direction. Accordingly, the common and pixel electrodes are formed in the bent-structure, so that each pixel region is divided into a plurality of domains. By providing the plurality of domains in each pixel region, it is possible to vary the alignment direction of liquid crystal molecules, thereby preventing the color shift from occurring by the viewing-angle direction.

As mentioned above, a liquid crystal device according to the present invention and the method of fabricating the same have the following advantages.

In the liquid crystal device according to the present invention, the interval between the common and pixel electrodes is decreased, and the two electrodes are formed of transparent conductive material. As the interval is decreased between the common and pixel electrodes, the LCD device can be driven with a small voltage.

It will be apparent to those skilled on the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An LCD device comprising:
   first and second substrate facing each other;
   gate and data lines formed on the first substrate, wherein the gate and data lines are formed substantially perpendicularly with respect to each other to define a pixel region;
   common and pixel electrodes formed in the pixel region and on the same plane,
   wherein the common and pixel electrodes are arranged in an alternating pattern with empty space therebetween,
   wherein the empty space formed between the common and pixel electrodes is filled with air having a low conductivity, whereby the empty space functions as an insulation layer and
   wherein a horizontal electric field is generated between the common and pixel electrodes; and
   a liquid crystal layer formed between the first and second substrates.

2. The LCD device of claim 1, wherein the empty space between the common and pixel electrodes has a width of about 0.1 µm to 3 µm.

3. The LCD device of claim 1, wherein the common and pixel electrodes are formed of a transparent conductive material.

4. The LCD device of claim 1, wherein the common and pixel electrodes are formed in a bent structure.

5. The LCD device of claim 1, further comprising a thin film transistor formed at a crossing portion of the gate and data lines.

6. The LCD device of claim 5, wherein the thin film transistor includes:
   a gate electrode;
   an active layer formed on the gate electrode; and
   source and drain electrodes formed on the active layer.

7. A method of fabricating an LCD device comprising:
   forming a gate line having a gate electrode and a common line on a substrate;
   forming a first conductive layer on the substrate having the gate line;
   forming a first conductive layer pattern electrically connected with the common line on the substrate where the common line is formed by patterning first conductive layer;
   providing a gate insulation layer on the gate electrode where the first conductive layer pattern is formed;
   sequentially forming an active layer and a data line having source and drain electrodes;
   forming a passivation layer and a photoresist pattern that covers a part of a passivation layer corresponding to the conductive layer pattern on an entire surface of the substrate where the active layer is formed;
   etching the passivation layer using the photoresist pattern as a mask to form a passivation layer pattern, wherein the passivation layer pattern is undercut by dry-etching the passivation layer;
   etching the first conductive layer pattern positioned below the undercut passivation layer pattern using the photoresist pattern as a mask to form a common electrode having an under-cut side surface;
   forming a second conductive layer on the substrate having the photoresist pattern and the common electrode, wherein an empty space formed by the undercut corresponds to an interval between the second conductive layer and the common electrode; and
   removing the second conductive layer on the photoresist pattern and the photoresist pattern using a lift-off method to form a pixel electrode spaced from the common electrode a width of the empty space, wherein the empty space formed between the common and pixel electrodes is filled with air having a low conductivity, whereby the empty space functions as an insulation layer.

8. The method of claim 7, wherein the common and pixel electrodes are formed of a transparent conductive layer.

9. The method of claim 7, wherein the common electrode is formed to have an under-cut side surface of about 0.1 µm to 3 µm by wet-etching the first conductive layer pattern.

10. The method of claim 7, wherein the common electrode and the pixel electrode are formed in a bent-structure in a plane view.

* * * * *